(12) United States Patent
Ajito

(10) Patent No.: US 10,306,164 B2
(45) Date of Patent: May 28, 2019

(54) IMAGE PICKUP APPARATUS, IMAGE PICKUP METHOD, AND RECORDING MEDIUM HAVING RECORDED IMAGE PICKUP PROGRAM

(71) Applicant: Olympus Corporation, Hachioji-shi, Tokyo (JP)

(72) Inventor: Takeyuki Ajito, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/890,340

(22) Filed: Feb. 6, 2018

(65) Prior Publication Data

US 2018/0167569 A1 Jun. 14, 2018

Related U.S. Application Data

(63) Continuation of application No. PCT/JP2016/053212, filed on Feb. 3, 2016.

(30) Foreign Application Priority Data

Aug. 26, 2015 (JP) ................... 2015-167096

(51) Int. Cl.
*H04N 5/225* (2006.01)
*H04N 5/217* (2011.01)
(Continued)

(52) U.S. Cl.
CPC ......... *H04N 5/3572* (2013.01); *G06T 3/4015* (2013.01); *G06T 5/006* (2013.01);
(Continued)

(58) Field of Classification Search
CPC ......... G06T 5/00; G06T 5/006; G06T 3/4015; H04N 3/1587; H04N 5/349; H04N 5/3572; H04N 9/04515
See application file for complete search history.

(56) References Cited

U.S. PATENT DOCUMENTS 7,706,608 B2 * 4/2010 Sawada .................. H04N 1/648
382/167
8,902,329 B2 * 12/2014 Terasawa ................ G06T 5/006
348/222.1
(Continued)

FOREIGN PATENT DOCUMENTS

EP 2 111 038 10/2009
JP 06-225317 8/1994
(Continued)

OTHER PUBLICATIONS

International Search Report to International Patent Application No. PCT/JP2016/053212, dated Apr. 19, 2016, (2 pgs.), with translation (2 pgs.).

*Primary Examiner* — Ngoc Yen T Vu
(74) *Attorney, Agent, or Firm* — John C. Pokotylo; Pokotylo Patent Services

(57) ABSTRACT

An image pickup apparatus includes: an image pickup device that includes pixels in a predetermined color array and is configured to be able to acquire a plurality of color array images corresponding to the color array through pixel shift; a chromatic aberration correction processing section configured to receive the plurality of color array images and to perform chromatic aberration correction processing on each of the plurality of color array images; a pixel shift composition processing section configured to perform pixel shift composition processing on the plurality of color array images that are subjected to the chromatic aberration correction processing by the chromatic aberration correction processing section, to acquire a pixel shift high-resolution image; and a demosaicking processing section configured to perform demosaicking processing on the pixel shift high-resolution image.

13 Claims, 14 Drawing Sheets

(51) Int. Cl.
*H04N 5/357* (2011.01)
*H04N 5/232* (2006.01)
*G06T 5/00* (2006.01)
*G06T 5/20* (2006.01)
*H04N 5/349* (2011.01)
*H04N 9/04* (2006.01)
*G06T 3/40* (2006.01)

(52) U.S. Cl.
CPC ............... *G06T 5/20* (2013.01); *H04N 5/232* (2013.01); *H04N 5/349* (2013.01); *H04N 9/04515* (2018.08); *H04N 9/04517* (2018.08); *G06T 2207/10024* (2013.01)

(56) References Cited

U.S. PATENT DOCUMENTS

| | | | |
|---|---|---|---|
| 9,191,580 B2 * | 11/2015 | Venkataraman | H04N 5/2253 |
| 9,262,813 B2 * | 2/2016 | Kotani | H04N 5/23216 |
| 9,426,362 B2 * | 8/2016 | Tang | H04N 5/23232 |
| 2009/0263018 A1 | 10/2009 | Murakami | |

FOREIGN PATENT DOCUMENTS

| | | |
|---|---|---|
| JP | 2005-044098 | 2/2005 |
| JP | 2009-253667 | 10/2009 |
| JP | 2009-260620 | 11/2009 |
| WO | WO 2009/125673 | 10/2009 |

* cited by examiner

| G'1 | R'1 | G'3 | R'2 |
| --- | --- | --- | --- |
| B'1 | G'2 | B'2 | G'4 |
| G'5 | R'3 | G'7 | R'4 |
| B'3 | G'6 | B'4 | G'8 |

IMAGE PICKUP APPARATUS, IMAGE PICKUP METHOD, AND RECORDING MEDIUM HAVING RECORDED IMAGE PICKUP PROGRAM

CROSS REFERENCE TO RELATED APPLICATION

This application is a continuation application of PCT/JP2016/053212 filed on Feb. 3, 2016 and claims benefit of Japanese Application No. 2015-167096 filed in Japan on Aug. 26, 2015, the entire contents of which are incorporated herein by this reference.

BACKGROUND OF THE INVENTION

1. Field of the Invention

The present invention relates to an image pickup apparatus that performs pixel shift to generate a high-resolution composite image, an image pickup method, and a recording medium having a recorded image pickup program.

2. Description of the Related Art

In an optical system of a camera, chromatic aberration and distortion aberration typically appear. Japanese Patent Application Laid-Open Publication No. 2005-44098 discloses a technology in which distortion aberration correction is performed through pipeline processing. In the pipeline processing, each processing circuit that performs a plurality of kinds of processing including image processing such as aberration correction directly outputs a processed signal to a subsequent processing circuit. In other words, in the pipeline processing, data such as image data is read out from a memory, and the number of times of data transfer for storing processed data in the memory is small, which allows for reduction of a bus band for the data transfer. In addition, in the pipeline processing, each process is performed as flow processing, which makes it possible to totally increase the speed of the processing. Note that each processing circuit includes a memory (hereinafter, referred to as a buffer memory) that holds an output of the preceding processing circuit for execution of processing.

In addition, a technology in which a plurality of images acquired through pixel shift by a movement of non-integral multiple of a pixel pitch are composed to generate a high-resolution composite image has been proposed. For example, in Japanese Patent Application Laid-Open Publication No. H6-225317, photographing is performed a plurality of times while shifting a CCD or the like with a low number of pixels by 0.5 pixel, and a plurality of photographed images are composed to acquire a high-resolution image.

SUMMARY OF THE INVENTION

An image pickup apparatus according to an aspect of the present invention includes: an image pickup device that includes pixels in a predetermined color array and is configured to be able to acquire a plurality of color array images corresponding to the color array through pixel shift; a chromatic aberration correction processing section configured to receive the plurality of color array images and to perform chromatic aberration correction processing on each of the plurality of color array images; a pixel shift composition processing section configured to perform pixel shift composition processing on the plurality of color array images that are subjected to the chromatic aberration correction processing by the chromatic aberration correction processing section, to acquire a pixel shift high-resolution image; and a demosaicking processing section configured to perform demosaicking processing on the pixel shift high-resolution image.

In addition, an image pickup apparatus according to another aspect of the present invention includes: an image pickup device that includes pixels in a predetermined color array and is configured to be able to acquire a plurality of color array images corresponding to the color array through pixel shift; a pixel shift composition processing section configured to perform pixel shift composition processing to acquire a pixel shift high-resolution image; an image processing section that can perform first image processing pipeline processing in which processing by a chromatic aberration correction processing section is performable, second image processing pipeline processing in which a series of processes by a demosaicking processing section and a distortion aberration correction processing section is performable, and third image processing pipeline processing in which a series of processes by the chromatic aberration correction processing section, the demosaicking processing section, and the distortion aberration correction processing section is performable; and a control section configured to control order of the pixel shift composition processing and the first to third image processing pipeline processing.

In addition, an image pickup method according to an aspect of the present invention includes: acquiring a plurality of color array images corresponding to a predetermined color array through pixel shift photographing by an image pickup device that includes pixels in the predetermined color array; performing chromatic aberration correction processing on each of the plurality of color array images; performing pixel shift composition processing on the plurality of color array images subjected to the chromatic aberration correction processing to acquire a pixel shift high-resolution image; and performing demosaicking processing on the pixel shift high-resolution image.

Moreover, a non-temporary computer-readable recording medium having a recorded image pickup program according to an aspect of the present invention has the image pickup program that causes a computer to execute: acquiring a plurality of color array images corresponding to a predetermined color array through pixel shift photographing by an image pickup device that includes pixels in the predetermined color array; performing chromatic aberration correction processing on each of the plurality of color array images; performing pixel shift composition processing on the plurality of color array images subjected to the chromatic aberration correction processing to acquire a pixel shift high-resolution image; and performing demosaicking processing on the pixel shift high-resolution image.

DETAILED DESCRIPTION OF THE PREFERRED EMBODIMENTS

Some embodiments of the present invention are described in detail below with reference to drawings.

First Embodiment

Figure 1:
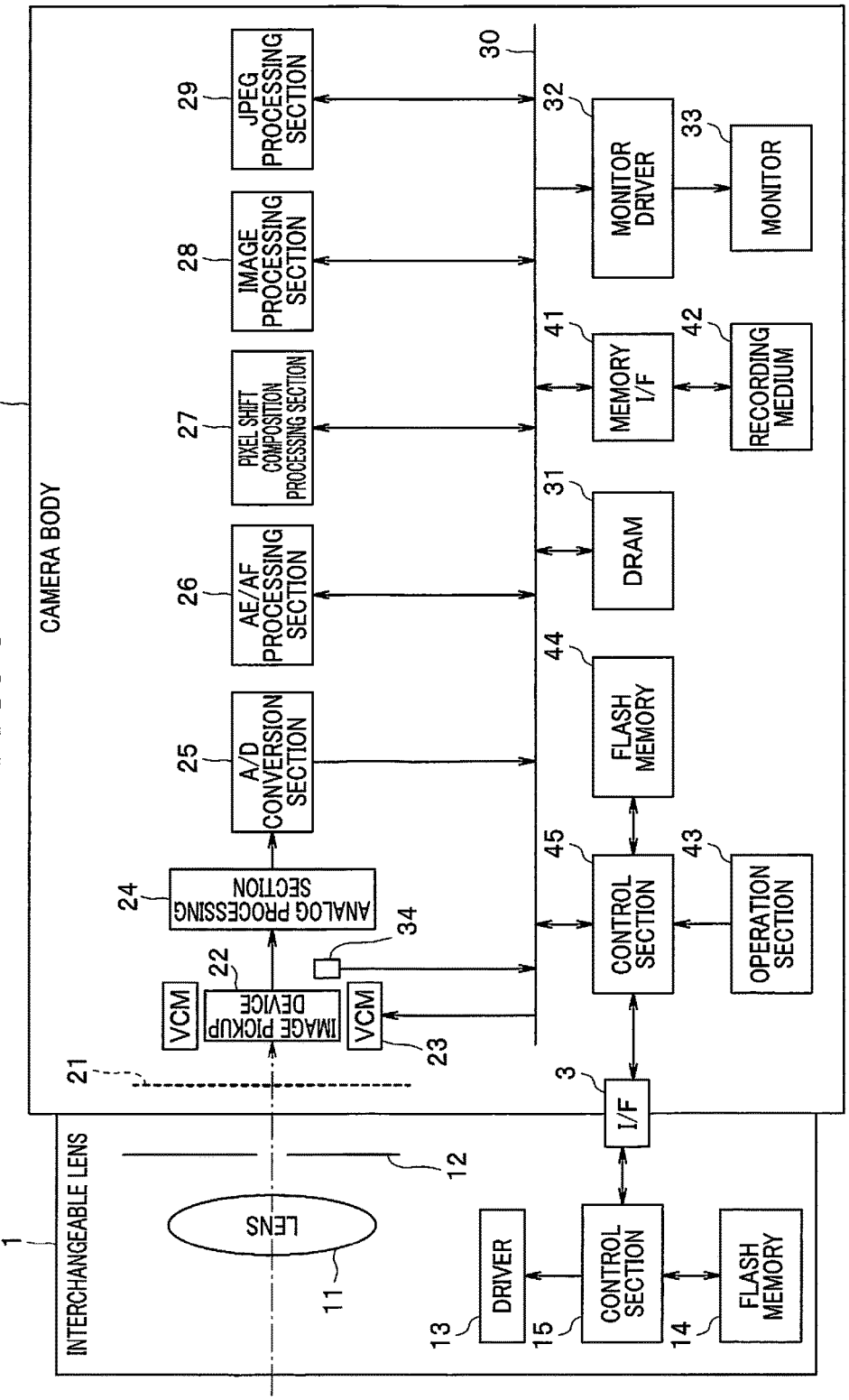
FIG. 1 is a block diagram illustrating an image pickup apparatus according to a first embodiment of the present invention.
Figure 2:
FIG. 2 is an explanatory diagram to explain a pixel range (block) necessary for distortion correction.

FIG. 1 is a block diagram illustrating an image pickup apparatus according to a first embodiment of the present invention. FIG. 2 is an explanatory diagram to explain a pixel range (block) necessary for aberration correction and illustrates comparison between the pixel range in normal resolution processing without pixel shift high-resolution processing and the pixel range in the pixel shift high-resolution processing.

First, a capacity of a buffer memory necessary for each of processing circuits that perform pipeline processing is described with reference to FIG. 2. A picked-up image acquired in an image pickup system includes chromatic aberration and distortion aberration due to influence of the optical system and the like. When chromatic aberration correction and distortion aberration correction are performed, the chromatic aberration correction is typically performed first. In the chromatic aberration correction, for example, processing to correct pixel positions of respective pixels of colors R and G with reference to pixel positions of color G is performed. Thereafter, R, G, and B signals with corrected chromatic aberration are converted into, for example, signals in an YCbCr color space through demosaicking processing. An image obtained by the conversion processing contains luminance information, and the distortion aberration correction is performed on the luminance information. In other words, the distortion aberration correction is not divided for each color, and is performed only once on the luminance information. This reduces an entire arithmetic quantity.

The picked-up image provided from the image pickup system is stored in a memory that has a capacity to hold an image of one frame, and is then supplied to each of the processing circuits. In this case, pipeline processing is performed in order to reduce a transmission band necessary for a bus to achieve high-speed processing.

In addition, to reduce the capacity of the buffer memory of each of the processing circuits necessary for the pipeline processing, transfer from a DRAM (dynamic RAM) that is a memory holding the picked-up image of one frame, to each of the processing circuits is performed in units of a block. This makes it possible to reduce the capacity of the buffer memory of each of the processing circuits to a data amount of the block.

In contrast, the pixel shift high-resolution processing is to compose picked-up images that are obtained while the image pickup device is shifted by, for example, ½ pixel, thereby acquiring an image, the resolution of which is doubled in each of vertical and horizontal directions, namely, is quadrupled in total. In the case where the pixel shift high-resolution processing is performed, a capacity necessary for the DRAM becomes four times the capacity in the normal resolution processing.

A region denoted by a reference numeral Bn1 in FIG. 2 indicates a range Bn1 of the picked-up image finally outputted by a series of processes of the pipeline processing once (hereinafter, referred to as an output block). To correct the aberration of the output block Bn1, image information of a range (hereinafter, referred to as a transfer block) of a picked-up image that includes the output block Bn1 and is wider than the output block Bn1 is necessary. First, as described above, the chromatic aberration correction is performed. When it is assumed, as for the output block Bn1, that distortion of an R component is represented by a region Bnr in FIG. 2, distortion of a G component is represented by a region Bng in FIG. 2, and distortion of a B component is represented by a region Bnb in FIG. 2, the transfer block necessary for the chromatic aberration correction to obtain the output block Bn1 is represented by a block Bntc in FIG. 2 that includes these regions Bnr, Bng, and Bnb.

In the chromatic aberration correction, correction to make the R component and the B component coincident with the G component is performed. In the distortion aberration correction after the chromatic aberration correction, it is only necessary to consider the size of the G component, and a block necessary to obtain the output block Bn1 becomes a block Bnty including the region Bng. The size of the block Bntc is larger than the size of the block Bnty, and the size of the transfer block is provided by the block Bntc. Note that an amount of the aberration is previously known from lens characteristics, and the range of the transfer block necessary to correct the range of the output block is also known. In other words, in the example of FIG. 2, the block Bntc is a known range, and it is only necessary to set the capacity of the buffer memory of each of the processing circuits performing the pipeline processing to a capacity that holds an image having the range of the block Bntc.

At this time, it is assumed that the number of pixels of the picked-up image is doubled in each of the vertical and horizontal directions, namely, is quadrupled in total by the pixel shift high-resolution processing. A hatched region denoted by a reference numeral Bn2 in FIG. 2 represents ½ region in each of the vertical and horizontal directions of the output block Bn1, namely, ¼ region in total. Further, a hatched region denoted by a reference numeral Bh1 in FIG. 2 represents an output block Bh1 that corresponds to the output block Bn2 in the pixel shift high-resolution processing. In other words, the output block Bh1 is an image part of the image range the same as the output block Bn2 in the picked-up image, and for example, the number of pixels of the output block Bh1 is doubled in each of the vertical and horizontal direction, namely, is quadrupled in total by the pixel shift high-resolution processing, as compared with the number of pixels of the output block Bn2.

When it is assumed that, as for the output block Bh1, distortion of the R component is represented by a region Bhr in FIG. 2, distortion of the G component is represented by a region Bhg in FIG. 2, and distortion of the B component is represented by a region Bhb in FIG. 2, the block necessary for the chromatic aberration correction to obtain the output block Bh1 is represented by a block Bhtc in FIG. 2 that includes these regions Bhr, Bhg, and Bhb.

In contrast, the block necessary for the distortion aberration correction after the chromatic aberration correction to obtain the output block Bh1 becomes a block Bhty including the region Bhg. The distortion aberration is considered to occur in a substantially similar shape, and it is considered that the block size necessary for the distortion aberration correction is also doubled in each of the vertical and horizontal directions, namely, is quadrupled in total when the size of the output block is doubled in each of the vertical and horizontal directions, namely, is quadrupled in total. Accordingly, as illustrated in FIG. 2, the size of the block Bhty is substantially equivalent to the size of the block Bnty. Therefore, also in the pixel shift high-resolution processing, the size of the transfer block for the distortion aberration correction is set to the size similar to the normal resolution processing, and the processing is performed for each ¼ of the size in the normal resolution processing to perform the aberration correction without changing the size of the transfer block.

For example, in the image pickup device having Bayer array, however, the pixels of the colors R, G, and B are dot-sequentially arranged, and the R, G, and B images are not separated in the picked-up image. Therefore, performing the pixel shift high-resolution processing increases the number of pixels of one color of the color array of the image pickup device due to interposing of the pixels of the other colors. Accordingly, as illustrated by the regions Bhr, Bhg, and Bhb in FIG. 2, the block range necessary for the correction of the range in the pixel shift high-resolution processing becomes larger than the block range in the normal resolution processing. In FIG. 2, extension from the block Bhty to the block Bhtc is substantially twice in both of the vertical direction and the lateral direction the extension from the block Bnty to the block Bntc.

In consideration of the chromatic aberration correction, it is necessary to make the size of the transfer block necessary for the pixel shift high-resolution processing larger than the size of the transfer block necessary for the normal resolution processing, and it is necessary to increase the transmission band and the capacity of the buffer memory.

Accordingly, in the present embodiment, the chromatic aberration correction is performed on the image in the normal resolution state, and composition processing for the pixel shift high-resolution processing is performed on the image after the chromatic aberration correction, which allows for reduction of the transmission band and the capacity of the buffer memory.

In FIG. 1, the image pickup apparatus includes an interchangeable lens 1 and a camera body 2 that are communicably connected to each other through an interface (I/F) 3. The interchangeable lens 1 is detachably attached to the camera body 2 through, for example, an unillustrated lens mount. The interface 3 is configured of electric contacts (an electric contact provided on the interchangeable lens 1 and an electric contact provided on the camera body 2) and the like provided on the lens mount. The interchangeable lens 1 is thus communicable with the camera body 2 through the interface 3.

The interchangeable lens 1 includes a lens 11, an aperture 12, a driver 13, a flash memory 14, and a control section 15. The lens 11 configures a photographing optical system that forms an optical image of an object on an image pickup device 22 described later of the camera body 2. The aperture 12 is an optical aperture that controls a passage range of a light flux passing through the lens 11.

The driver 13 drives the lens 11 to adjust a focus position based on an instruction from the control section 15. When the lens 11 is an electric zoom lens or the like, the driver 13 further performs change of a focal length. In addition, the driver 13 drives the aperture 12 to change an opening diameter based on an instruction from the control section 15. The driving of the aperture 12 changes brightness of the optical image of the object, and also changes a degree of blur. Note that, in a case where a plurality of images are acquired while the pixel shift is performed in the pixel shift high-resolution processing mode described later, the aperture 12 is not driven and is maintained from a time point before a first image is acquired until a time point after a final image is acquired. This is because vibration when the aperture 12 is driven is prevented from influencing the pixel shift position. The flash memory 14 is a memory medium that holds a control program to be executed by the control section 15 and various kinds of information relating to the interchangeable lens 1.

The control section 15 is configured of an unillustrated processor such as a CPU, and controls each section according to the program held by the memory. The control section 15 is connected to the driver 13, the flash memory 14, and the interface 3. The control section 15 communicates with a control section 45 of the camera body described later through the interface 3, reads and writes information held by the flash memory 14 in response to an instruction from the control section 45, and controls the driver 13. Further, the control section 15 transmits the various kinds of information relating to the interchangeable lens 1 to the control section 45.

The interface 3 connects the control section 15 of the interchangeable lens 1 and the control section 45 of the camera body 2 in a bi-directionally communicable manner.

The camera body 2 includes a mechanical shutter 21, the image pickup device 22, a voice coil motor (VCM) 23, an analog processing section 24, an analog/digital conversion section (A/D conversion section) 25, a bus 30, a DRAM 31, an AE/AF processing section 26, a pixel shift composition processing section 27, an image processing section 28, a JPEG processing section 29, a monitor driver 32, a monitor 33, a Hall device 34, a memory interface (memory I/F) 41, a recording medium 42, an operation section 43, a flash memory 44, and the control section 45.

The control section 45 is configured of an unillustrated processor such as a CPU, and controls each section according to a program held by the memory. The control section 45 controls each of the sections in the camera body 2, and transmits an instruction to the control section 15 through the interface 3 to control the interchangeable lens 1. The control section 45 generally controls the image pickup apparatus. When a user performs operation input through the operation section 43, the control section 45 reads parameters necessary for processing from the flash memory 44 according to a processing program held by the flash memory 44, thereby executing various kinds of sequences corresponding to operation contents.

The mechanical shutter 21 controls a time necessary for the optical flux from the lens 11 to reach the image pickup device 22, and for example, has a configuration to run a shutter curtain. The mechanical shutter 21 is driven in response to an instruction from the control section 45, and controls the arrival time of the optical flux to the image pickup device 22, namely, controls an exposure time period of the object by the image pickup device 22. Note that, in the case where the plurality of images are acquired while the pixel shift is performed in the pixel shift high-resolution processing mode described later, the mechanical shutter 21 is maintained in an open state from the time point before the first image is acquired until the time point after the final image is acquired. This is because vibration when the mechanical shutter 21 is opened or closed is prevented from influencing the pixel shift position.

The image pickup device 22 includes a plurality of pixels that are two-dimensionally arranged with a predetermined pixel pitch (refer to a pixel pitch P illustrated in FIG. 5), and photoelectrically converts the optical image of the object that is formed through the lens 11 and the aperture 12 to generate an image signal, under the control of the control section 45. The image pickup device 22 reads out the photographed images in a predetermined reading order (e.g., in order of rolling readout (or raster scan)). Further, the image pickup device 22 can read only an image of a desired pixel region (e.g., desired line group).

The image pickup device 22 according to the present embodiment is configured by arranging color filters of a plurality of colors including a luminance correspondence color (e.g., green) such that one color corresponds to one pixel. More specifically, the image pickup device 22 according to the present embodiment is configured as a single plate image pickup device in which color filters of primary color Bayer array are disposed in front of the plurality of pixels that are arranged in a vertical direction and a horizontal direction. Note that the image pickup device 22 is not limited to the single plate image pickup device as a matter of course, and may be, for example, a multilayer image pickup device in which color components are separated in a substrate thickness direction.

The voice coil motor (VCM) 23 changes a relative position in the above-described two-dimensional arrangement direction between the image pickup device 22 and an optical flux received by the image pickup device 22. The VCM 23 moves the relative position by a movement of non-integral multiple of the pixel pitch. The VCM 23 performs so-called pixel shift in order to obtain a plurality of relative positions different in the movement. More specifically, the VCM 23 floats the image pickup device 22 by magnetic force and controls the magnetic force to move the image pickup device 22.

In the configuration example illustrated in FIG. 1, the VCM 23 moves the image pickup device 22 in a plane perpendicular to an optical axis of the lens 11; however, the lens 11 or both of the image pickup device 22 and the lens 11 may be moved. In the present embodiment, the VCM 23 is used to move the image pickup device 22 by the movement of non-integral multiple of the pixel pitch, for example, a movement in units of a half pixel pitch when a plurality of images are photographed in order to obtain a composite image with resolution higher than resolution of the image obtained by the image pickup device 22. Note that the Hall device 34 judges the position of the image pickup device 22 and provides a judgement result to the control section 45. The control section 45 drives the VCM 23 with use of the judgement result of the Hall device 34, thereby moving the image pickup device 22 to an accurate position.

Note that the VCM 23 is described as an example of the mechanism performing the pixel shift; however, the mechanism is not limited to the VCM 23. A mechanism that causes positional shift from the desired relative position in the pixel shift may be adopted to widely apply the present invention.

The analog processing section 24 performs waveform shaping on an analog image signal read out from the image pickup device 22 after reducing reset noise and the like, and further increases a gain in order to obtain desired brightness. The A/D conversion section 25 converts the analog image signal outputted from the analog processing section 24 into a digital image signal.

The bus 30 is a transfer path to transfer various kinds of data and control signals generated at certain positions in the camera body 2 to other positions in the camera body 2. The bus 30 in the present embodiment is connected to the VCM 23, the A/D conversion section 25, the DRAM 31, the AE/AF processing section 26, the pixel shift composition processing section 27, the image processing section 28, the JPEG processing section 29, the monitor driver 32, the Hall device 34, the memory I/F 41, and the control section 45.

The image outputted from the A/D conversion section 25 is transferred through the bus 30, and is stored in the DRAM 31 once. Note that the image outputted from the A/D conversion section 25 is an image only including single color information in which pixels correspond to the color array (hereinafter, referred to as a color array image), and the image is also appropriately referred to as a RAW image in the following. Note that, in particular, in a case where the color array is the Bayer array, the color array image outputted from the image pickup device is also referred to as a Bayer image.

Note that, in the pixel shift high-resolution processing mode, the VCM 23 and the image pickup device 22 are driven and controlled by the control section 45, and pixel shift photographing in which photographing is performed a plurality of times while moving the image pickup device 22 is performed. In the pixel shift high-resolution processing mode, the plurality of images obtained by the pixel shift photographing are also stored in the DRAM 31. The DRAM 31 is a memory section that temporarily holds not only the images obtained in the normal resolution processing mode and the plurality of images obtained in the pixel shift photographing but also various kinds of data such as images processed by the pixel shift composition processing section 27, the image processing section 28, the JPEG processing section 29, and other sections. In the normal resolution processing mode, photographing is performed once by the image pickup device 22 without performing the pixel shift.

The AE/AF processing section 26 extracts a high-frequency component signal from the RAW image, and acquires a focusing evaluated value through autofocus (AF) integration processing. The focusing evaluated value acquired at this time is supplied to the control section 45 and is further transferred to the control section 15, thereby being used for AF driving of the lens 11. Not that the AF is not limited to such contrast AF as a matter of course, and a phase difference AF may be performed with use of, for example, a dedicated AF sensor (or AF pixels on the image pickup device 22).

The AF/AE processing section 26 calculates object luminance based on the RAW image. The object luminance calculated at this time is provided to the control section 45, and is used by the control section 45 for automatic exposure (AE) control, namely, control of the aperture 12, control of the mechanical shutter 21, exposure timing control of the image pickup device 22 (or control of a so-called device shutter), and the like. Note that the RAW image is used as the data for calculation of the object luminance; however, for example, a dedicated photometric sensor may be provided on the camera body 2 and obtained data may be alternatively used.

The pixel shift composition processing section 27 performs pixel shift composition processing that composes the plurality of images obtained by the pixel shift photographing in which photographing is performed while the image pickup device 22 is moved by the VCM 23, thereby generating a composite image with higher resolution (hereinafter, referred to as a high-resolution image) than resolution of the image that is obtained by the image pickup device 22 without performing the pixel shift (hereinafter, referred to as the normal resolution image).

Figure 3:
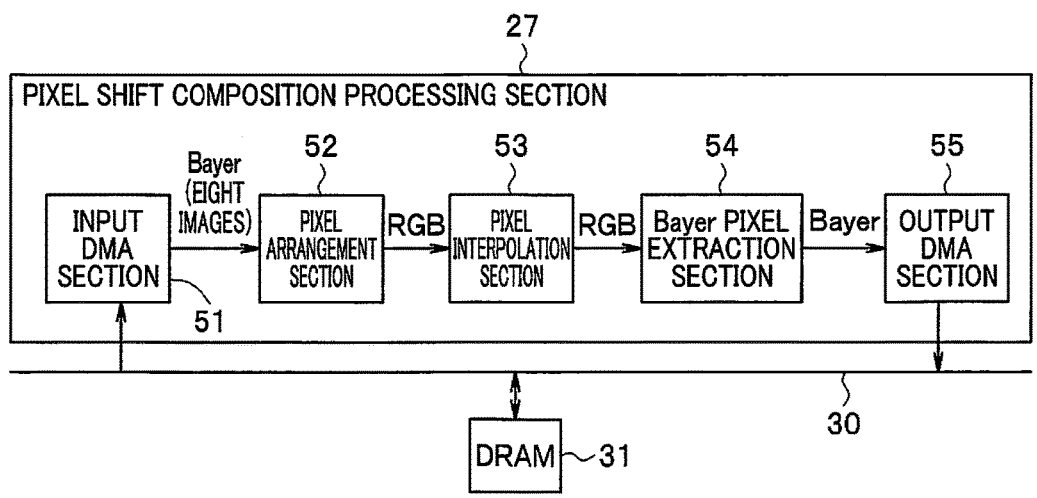
FIG. 3 is a block diagram illustrating an example of a specific configuration of a pixel shift composition processing section 27 in FIG. 1.
Figure 4:
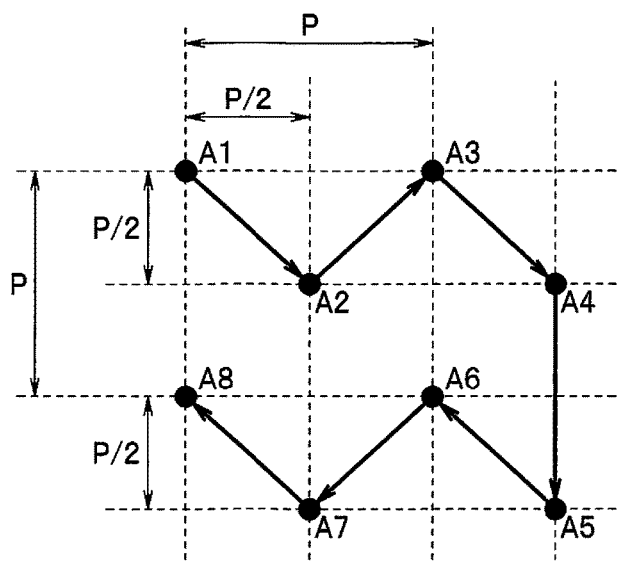
FIG. 4 is an explanatory diagram to explain movement of an image pickup device 22 in pixel shift.

FIG. 3 is a block diagram illustrating an example of a specific configuration of the pixel shift composition processing section 27 in FIG. 1. FIG. 4 is an explanatory diagram to explain movement of the image pickup device 22 in the pixel shift. In FIG. 4, a centering position of the image pickup device 22 is illustrated by a circular dot. In the example of FIG. 4, as illustrated by circular dots A1 to A8, the pixel shift photographing is performed eight times while changing the centering position to eight positions. Note that a symbol P in FIG. 4 indicates one pixel pitch and a distance between dashed lines corresponds to ½ pixel pitch.

Figure 5:
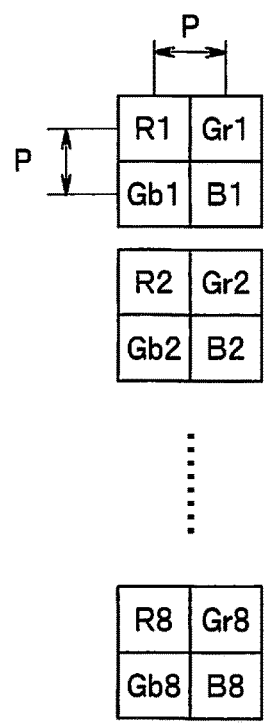
FIG. 5 is an explanatory diagram illustrating a basic color array of R, Gr, Gb, and B of eight Bayer images that are obtained by the image pickup device 22 while a centering position of the image pickup device 22 is changed as illustrated in FIG. 4.

FIG. 5 is an explanatory diagram illustrating basic color arrays of colors R, Gr, Gb, and B in eight Bayer images that are obtained by the image pickup device 22 while changing the centering position of the image pickup device 22 as illustrated in FIG. 4. Note that the symbol P in FIG. 5 indicates one pixel pitch. In addition, a subscript of each of the pixels R, Gr, Gb, and B indicates the number of times of the pixel shift photographing.

The picked-up images having the respective color arrays (the color array images or the RAW images) illustrated in FIG. 5 are stored in the DRAM 31. An input DMA section 51 takes in the RAW images transferred from the DRAM 31 through direct memory access (DMA) via the bus 30, and provides the RAW images to a pixel arrangement section 52. Note that the RAW image indicates luminance values of respective color pixels in the Bayer array of the image pickup device 22. The pixel arrangement section 52 separates each color from the eight images obtained through the pixel shift, and performs arrangement for each color.

Figure 6A:
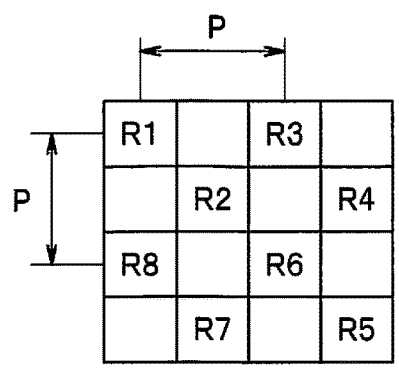
FIG. 6A is an explanatory diagram illustrating a color array of R pixels.
Figure 6B:
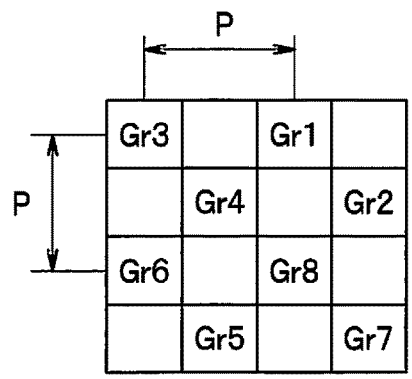
FIG. 6B is an explanatory diagram illustrating a color array of Gr pixels.
Figure 6C:
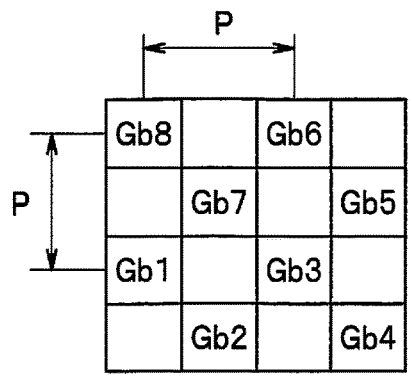
FIG. 6C is an explanatory diagram illustrating a color array of Gb pixels.
Figures 6D, 7:
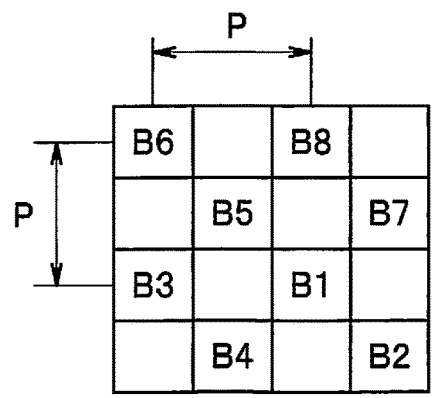
FIG. 6D is an explanatory diagram illustrating a color array of B pixels.
FIG. 7 is an explanatory diagram illustrating a color array of a composite image generated by a Bayer pixel extraction section 54.

FIG. 6A to FIG. 6D are explanatory diagrams respectively illustrating the color array of the R pixels, the color array of the Gr pixels, the color array of the Gb pixels, and the color array of the B pixels. Note that the symbol P in FIG. 6A to FIG. 6D indicates one pixel pitch, and a distance of a lattice corresponds to ½ pixel pitch. The pixel arrangement section 52 generates a composite image for each color of the color arrays illustrated in FIG. 6A to FIG. 6D, based on the eight color array images illustrated in FIG. 5. In other words, the pixel arrangement section 52 extracts the R components from the eight Bayer images that are configured by repeating the basic color array as illustrated in FIG. 5, and rearranges the R components according to the centering positions A1 to A8 illustrated in FIG. 4, thereby generating an R composite image having the color array in which pixels R1 to R8 are arranged in 4×4 color array as illustrated in FIG. 6A. Likewise, the pixel arrangement section 52 extracts each of the Gr components, the Gb components, and the B components from the eight Bayer images, and rearranges the Gb components, the Gr components, and the B components according to the centering positions A1 to A8, thereby generating a Gr composite image, a Gb composite image, and a B composite image having the respective color arrays as illustrated in FIG. 6B to FIG. 6D.

A pixel interpolation section 53 performs pixel interpolation processing for the relative positions of the pixels arranged by the pixel arrangement section 52. A result of the interpolation processing by the pixel interpolation section 53 is provided to a Bayer pixel extraction section 54. The Bayer pixel extraction section 54 generates a composite image (a high-resolution image) of the Bayer color array, based on the color images of four kinds of color arrays in FIG. 6A to FIG. 6D and the result of the interpolation processing by the pixel interpolation section 53.

FIG. 7 is an explanatory diagram illustrating a color array of the composite image generated by the Bayer pixel extraction section 54. As is obvious from comparison of FIG. 7, FIG. 6B, and FIG. 6C, the G pixels in the Bayer array are generated with use of the Gr pixels and the Gb pixels that are located at the respective same positions. In other words, the Bayer pixel extraction section 54 determines pixel values G'1 to G'8 of pixels G'1 to G'8 in FIG. 7 by the following calculation.

$$G'1 = (Gr3 + Gb8)/2$$

$$G'2 = (Gr4 + Gb7)/2$$

$$G'3 = (Gr1 + Gb6)/2$$

$$G'4 = (Gr2 + Gb5)/2$$

$$G'5 = (Gr6 + Gb1)/2$$

$$G'6 = (Gr5 + Gb2)/2$$

$$G'7 = (Gr8 + Gb3)/2$$

$$G'8 = (Gr7 + Gb4)/2$$

In addition, the pixel interpolation section 53 determines pixel values R'1 to R'4 of pixels R'1 to R'4 in FIG. 7 with use of the pixel values of the pixels of the same color on the periphery of each of the pixels. Likewise, the pixel interpolation section 53 determines pixel values B'1 to B'4 of pixels B'1 to B'4 in FIG. 7 with use of the pixel values of the pixels of the same color on the periphery of each of the pixels.

For example, the pixel interpolation section 53 determines the pixel values R'1 to R'4 and B'1 to B'4 by the following calculation when interpolation with peripheral four pixels is performed.

Note that, in the following calculation, "upper", "left", "right", and "lower" respectively indicate a 4×4 color array located on the upper side, a 4×4 color array located on the left side, a 4×4 color array located on the right side, and a 4×4 color array located on the lower side in the 4×4 color array illustrated in FIG. 6A or FIG. 6D.

$$R'1 = (R1 + R2 + R3 + (\text{upper } R7))/4$$

$$R'2 = (R3 + R4 + (\text{right } R1) + (\text{upper } R5))/4$$

$$R'3=(R2+R6+R7+R8)/4$$

$$R'4=(R4+R5+R6+(\text{right }R8))/4$$

$$B'1=(B3+B5+B6+(\text{left }B7))/4$$

$$B'2=(B1+B5+B7+B8)/4$$

$$B'3=(B3+B4+(\text{left }B2)+(\text{lower }B6))/4$$

$$B'4=(B1+B2+B4+(\text{lower }B8))/4$$

The Bayer pixel extraction section 54 provides the generated composite image (the high-resolution image) to an output DMA section 55. The output DMA section 55 transfers the provided high-resolution image to the bus 30 through DMA. In this way, the pixel shift composition processing section 27 averages a plurality of sets of pixel data corresponding to the luminance correspondence color (green in this case) acquired at the overlapped positions to generate composite pixel data at the overlapped positions, which reduces noise and achieves high image quality. As is obvious from comparison of FIG. 5 and FIG. 7, in the pixel shift high-resolution processing mode, the high-resolution image, the resolution of which is doubled in the horizontal direction and is doubled in the vertical direction, is obtainable.

Figure 8:
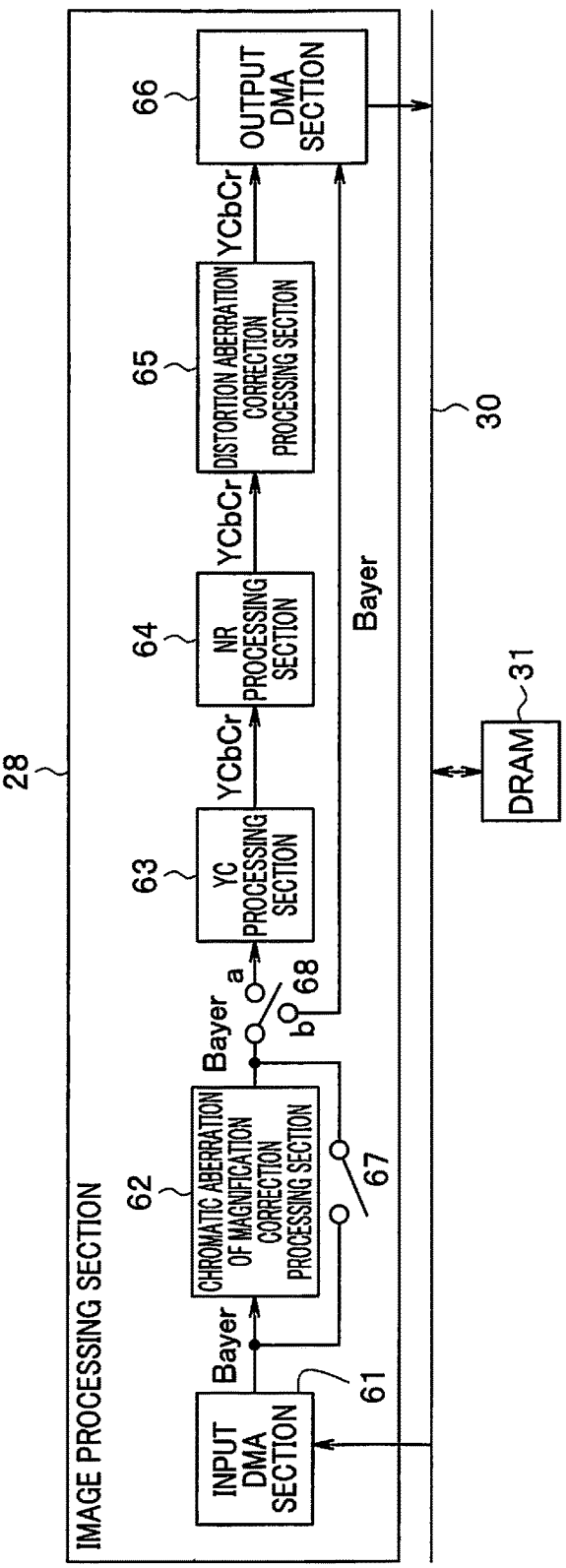
FIG. 8 is a block diagram illustrating an example of a specific configuration of an image processing section 28 in FIG. 1.

In FIG. 1, the image processing section 28 performs various image processing on the normal resolution image or the high-resolution image generated by the pixel shift composition processing section 27. FIG. 8 is a block diagram illustrating an example of a specific configuration of the image processing section 28 in FIG. 1.

An input DMA section 61 takes in the image transferred from the DRAM 31 through DMA via the bus 30 and provides the image to a chromatic aberration of magnification correction processing section 62. The chromatic aberration of magnification correction processing section 62 corrects chromatic aberration of magnification of the provided image. For example, the chromatic aberration of magnification correction processing section 62 so performs correction as to make the pixel positions of the R color image and the B color image coincident with the pixel positions of the G color image that are originally located at the same positions if there is no aberration, based on information of the optical system relating to the chromatic aberration of magnification. Note that, since the shift amount is different for each of colors R, G, and B of the image pickup device 22, it is not possible to accurately correct the shift of the image in which the colors R, G, and B are mixed due to three-plate form, for each color. Therefore, the chromatic aberration of magnification correction processing is performed before the pixel values of the Bayer image are converted into the values of the color image through the demosaicking processing. An output of the chromatic aberration of magnification correction processing section 62 is provided to an YC processing section 63 through a switch 68.

The YC processing section 63 performs demosaicking processing to convert the Bayer image (color array image) in which each of the pixels only has color information of single color of RGB components, into a color image in which each of the pixels has full color information. The YC processing section 63 serving as a demosaicking processing section converts, for example, the Bayer image into a color image in YCbCr space. In addition, the YC processing section 63 performs white balance correction processing before the demosaicking processing, and performs, for example, various kinds of processing such as color correction processing, gradation correction processing, and edge enhancement processing after the demosaicking processing. An output of the YC processing section 63 is provided to an NR processing section 64. The NR processing section 64 performs noise reduction processing on the provided image, and outputs the resultant image to a distortion aberration correction processing section 65.

The distortion aberration correction processing section 65 corrects distortion aberration of the provided image. For example, the distortion aberration correction processing section 65 so performs correction as to make the pixel positions of the image after the demosaicking processing coincident with the pixel positions that are originally located if there is no distortion, based on information of the optical system relating to the distortion aberration. The distortion aberration correction processing section 65 provides the image after the distortion aberration correction to an output DMA section 66. The output DMA section 66 transfers the provided image to the bus 30 through DMA.

In the present embodiment, switches 67 and 68 are provided in the image processing section 28 in order to switch whether the chromatic aberration of magnification correction processing is performed before the demosaicking processing by the YC processing section 63 or the chromatic aberration of magnification correction processing is performed after the demosaicking processing. The switches 67 and 68 are controlled by the control section 45.

The control section 45 turns off the switch 67 and causes the switch 68 to select a terminal a to provide, to the chromatic aberration of magnification correction processing section 62, the Bayer image provided through the input DMA section 61. Thereafter, the chromatic aberration correction is performed on the Bayer image, and the corrected image is supplied to the YC processing section 63 through the switch 68. In addition, the control section 45 turns off the switch 67 and causes the switch 68 to select a terminal b to provide the provided Bayer image to the chromatic aberration of magnification correction processing section 62. Thereafter, the chromatic aberration correction is performed on the Bayer image, and the corrected image is also directly provided to the output DMA section 66 through the switch 68. Furthermore, the control section 45 turns on the switch 67 and causes the switch 68 to select the terminal a to pass through the chromatic aberration of magnification correction processing. Accordingly, the Bayer image provided through the input DMA section 61 is supplied to the YC processing section 63 directly through the switch 68.

The image processing section 28 can perform the pipeline processing, and each of the processing sections in the image processing section 28 has a buffer memory for the pipeline processing.

In FIG. 1, when recording the image, the JPEG processing section 29 reads out the image from the DRAM 31, compresses the readout image according to the JPEG compression method, and stores the compressed image in the DRAM 31 once. The compressed image thus stored in the DRAM 31 is added with a header necessary for configuring a file and is prepared as recording data by the control section 45. Thereafter, the prepared recording data is stored in the recording medium 42 through the memory I/F 41 under control of the control section 45.

Further, the JPEG processing section 29 also expands the readout image. In other words, when the recorded image is reproduced, for example, a JPEG file is read out from the recording medium 42 through the memory I/F 41 and is stored in the DRAM 31 once, under control of the control section 45. The JPEG processing section 29 reads out the JPEG image stored in the DRAM 31, expands the readout JPEG image according to the JPEG expansion method, and stores the expanded image in the DRAM 31.

The monitor driver 32 reads out the image stored in the DRAM 31, converts the readout image into a video signal, and drives and controls the monitor 33, thereby displaying the image based on the video signal on the monitor 33. The image display performed by the monitor driver 32 includes, for example, a rec view display that displays an image immediately after photographing for a short time, reproduction display of the JPEG file recorded in the recording medium 42, and live view display.

The monitor 33 displays the image through the above-described driving and control by the monitor driver 32, and displays various kinds of information relating to the image pickup apparatus. In addition, as described above, the memory I/F 41 performs writing of the image in the recording medium 42 and readout of the image from the recording medium 42.

The recording medium 42 holds the image in a nonvolatile manner, and is configured of, for example, a memory card that is detachable to the camera body 2. The recording medium 42, however, is not limited to the memory card, and may be a disc-shaped recording medium or other optional recording medium. Therefore, the recording medium 42 does not necessarily have a configuration specific to the image pickup apparatus.

The operation section 43 is to perform various kinds of operation input to the image pickup apparatus, and includes operation buttons such as a power supply button, a release button, a reproduction button, a menu button, a cross key, and an OK button. The power supply button is to turn on or off the power supply of the image pickup apparatus. The release button is a two-stage operation button including, for example, a first release switch and a second release switch for start instruction of image photographing. The reproduction button is to perform reproduction of the recorded image. The menu button is to perform setting of the image pickup apparatus, etc. The cross key is used to select and operate items. The OK button is used for determination operation of the selected items. For example, the items settable with use of the menu button, the cross key, and the OK button include a photographing mode (such as the normal photographing mode and the pixel shift high-resolution processing mode), and a recording mode (such as a JPEG recording mode and a RAW+JPEG recording mode). When operation is performed on the operation section 43, a signal corresponding to the operation contents is outputted to the control section 45.

The flash memory 44 is a memory medium that holds a processing program executed by the control section 45 and various kinds of information relating to the image pickup apparatus in a nonvolatile manner. Some examples of the information held by the flash memory 44 include various kinds of parameters necessary for operation of the image pickup apparatus such as a parameter used for the edge enhancement processing and a parameter used for the noise reduction processing, information such as a magnitude, a direction, and order of the pixel shift in the pixel shift high-resolution processing mode, and a serial number for specifying the image pickup apparatus. The information held by the flash memory 44 is read by the control section 45.

Figure 9:
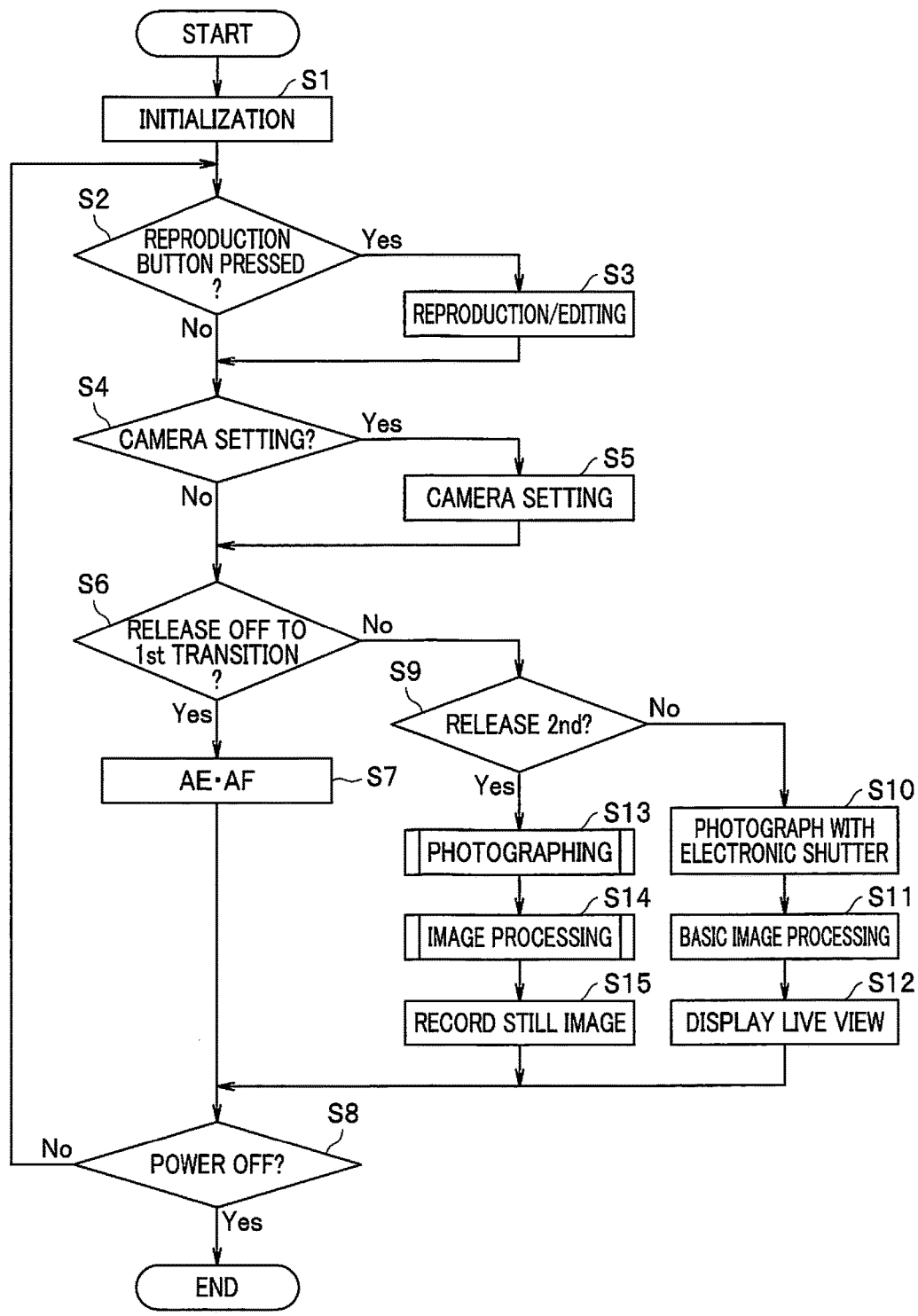
FIG. 9 is a flowchart illustrating an entire processing sequence of a camera.
Figure 10:
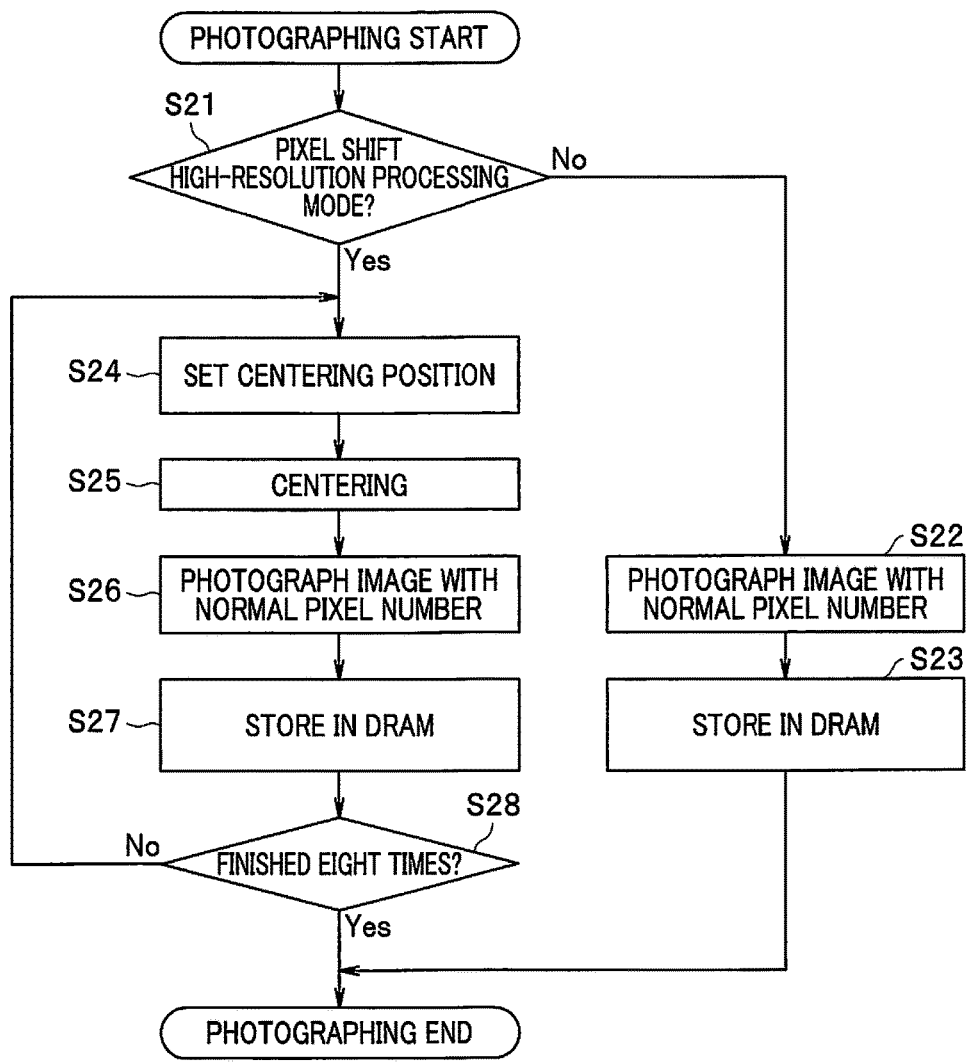
FIG. 10 is a flowchart illustrating a photographing sequence.
Figure 11:
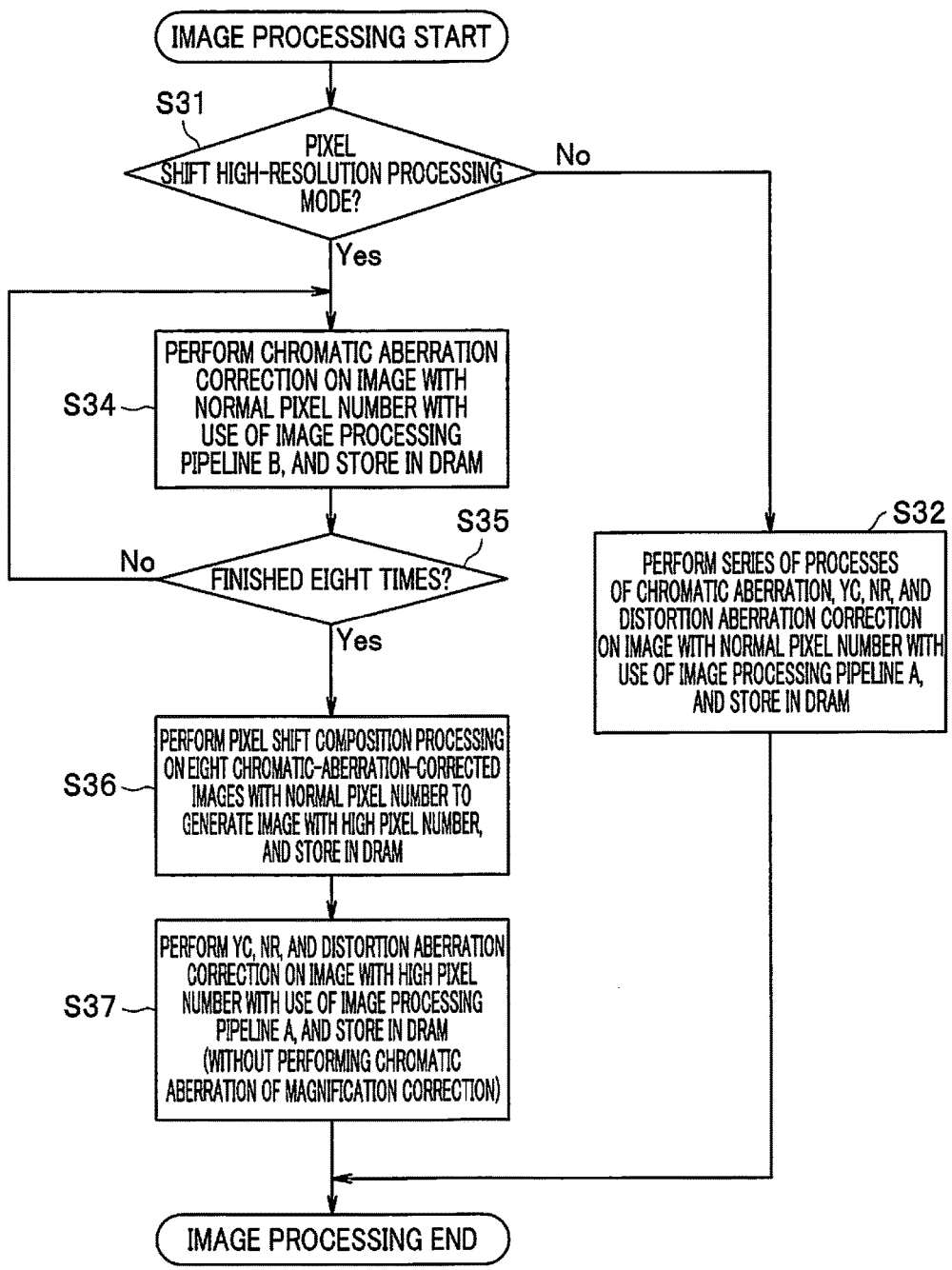
FIG. 11 is a flowchart illustrating an image processing sequence.

Next, operation of the embodiment having such a configuration is described with reference to flowcharts of FIG. 9 to FIG. 11 and explanatory diagrams of FIG. 12A to FIG. 12C. FIG. 9 illustrates an entire processing sequence of a camera, FIG. 10 illustrates a photographing sequence, and FIG. 11 illustrates an image processing sequence.

Each process in FIG. 9 is performed under control of the control section 45. When on operation is performed on an unillustrated power supply button of the operation section 43 and the power supply is accordingly turned on, the processing of FIG. 9 is started and initialization is first performed (step S1). Next, the control section 45 determines whether the reproduction button of the operation section 43 has been operated (step S2). When the reproduction button has been operated, reproduction and editing processing is performed (step S3). In the reproduction and editing processing, a list of files recorded in the recording medium 42 is displayed, selection operation by the user is waited for, a file selected and determined is reproduced, and a selected image is edited.

In step S4, the control section 45 determines whether the menu button of the operation section 43 has been operated and camera setting relating to the image pickup apparatus has been selected. When the camera setting has been selected, the control section 45 displays a menu to change the camera setting, on the monitor 33, and is put into a state waiting for the user operation to change the camera setting. Note that the camera setting includes the above-described various kinds of recording modes such as the normal resolution processing mode, the pixel shift high-resolution processing mode, the JPEG recording mode, and the RAW+JPEG recording mode; however, the camera setting is not limited to these modes. When the user operation is performed, the control section 45 performs the camera setting according to the operation contents (step S5).

In step S6, the control section 45 determines whether the release button has made a transition from an off state to a first release on state that is a first stage of the pressed state (so-called half-pressed state). When the state has made a transition to the first release on state, the AF/AE processing section 26 performs the automatic exposure (AE) control and the autofocus (AF) control for image photographing at the transition timing (step S7). As a result, so-called AE lock and AF lock are performed after the first release button is pressed.

When the control section 45 determines in step S6 that the release button has not made a transition to the first release on state, the control section 45 determines whether the release button has been in a second release on state (so-called full-pressed state) that is a second stage of the pressed state (step S9). Here, when the release button has not been in the second release on state, namely, when the operation of the release button has not been performed at all, the control section 45 shifts the processing from step S9 to step S10, releases the mechanical shutter 21, and performs the automatic exposure (AE) control for live view by the AF/AE processing section 26. Thereafter, the control section 45 performs image photographing of one frame (or one field, etc.) with use of an electronic shutter.

The control section 45 performs the basic image processing in which some of processes are omitted from the image processing performed on the recorded image, on the photographed image (step S11), and displays the frame image subjected to the basic image processing, on the monitor 33 as one frame of live view (step S12).

In contrast, when the user performs second release on operation, the control section 45 shifts the processing from step S9 to step S13 and executes photographing processing described later. Further, in step S14, the control section 45 performs image processing described later, and records the processed image in the recording medium 42 as a still image (step S15).

In step S8, the control section 45 determines whether off operation has been performed on the power supply button. When the off operation has not been performed, the control section 45 returns the processing to step S2 and repeats the above-described processing.

FIG. 10 illustrates an example of specific photographing processing in step S13 of FIG. 9.

In the photographing processing in step S13, first, the control section 45 determines whether the pixel shift high-resolution processing mode has been specified (step S21). When the pixel shift high-resolution processing mode has not been set, namely, when the normal resolution processing mode has been set, the control section 45 drives the aperture 12 to open the mechanical shutter 21, performs exposure by the image pickup device 22, and performs normal photographing processing to photograph one image (step S22). In other words, the image of the normal number of pixels that is the original number of pixels of the image pickup device 22 is photographed, and the photographed image is transferred to and stored in the DRAM 31 (step S23).

In contrast, when the pixel shift high-resolution processing mode has been set, the control section 45 performs setting for the pixel shift photographing. First, the control section 45 sets the centering position of the image pickup device 22 in a plane perpendicular to the optical axis of the lens 11 (step S24), and controls the VCM 23 to move the image pickup device 22 to the set centering position (step S25). In next step S26, the control section 45 drives the aperture 12 to open the mechanical shutter 21, performs exposure by the image pickup device 22, and performs normal photographing processing to photograph one image. The image of the normal number of pixels that is the original number of pixels of the image pickup device 22 is photographed, and the photographed image is transferred to and stored in the DRAM 31 (step S27).

In step S28, the control section 45 determines whether the photographing of the number of times set for the pixel shift photographing has been completed. For example, in the case where the pixel shift photographing illustrated in FIG. 4 is performed, the control section 45 determines whether the pixel shift photographing has been performed eight times, and repeats the processes in steps S24 to S27 until the photographing is performed the necessary number of times. The photographing is performed in the above-described manner, for example, while the center of the image pickup device 22 is moved to the eight centering positions illustrated in FIG. 4, and eight images of the normal number of pixels are accordingly photographed.

In other words, one Bayer image of the normal number of pixels that is the origin of the normal resolution image is stored in the DRAM 31 in the normal resolution processing mode, and eight Bayer images of the normal number of pixels that are photographed while the position of the image pickup device 22 is changed by ½ pixel pitch are stored in the DRAM 31 in the pixel shift high-resolution processing mode.

When the one Bayer image in the normal resolution processing mode or the eight Bayer images in the pixel shift high-resolution processing mode are stored in the DRAM 31, the image processing in step S14 in FIG. 9 is performed.

FIG. 11 illustrates an example of specific image processing in step S14 in FIG. 9.

In the image processing in step 14, first, the control section 45 determines whether the pixel shift high-resolution processing mode has been specified (step S31). When the pixel shift high-resolution processing mode has not been set, namely, when the normal resolution processing mode has been set, the control section 45 turns off the switch 67 and causes the switch 68 to select the terminal a. In this case, the image processing section 28 performs the processing by all of the processing sections 62 to 65. In the following, the line of the pipeline processing in this case is referred to as an image processing pipeline A.

Figure 12A:
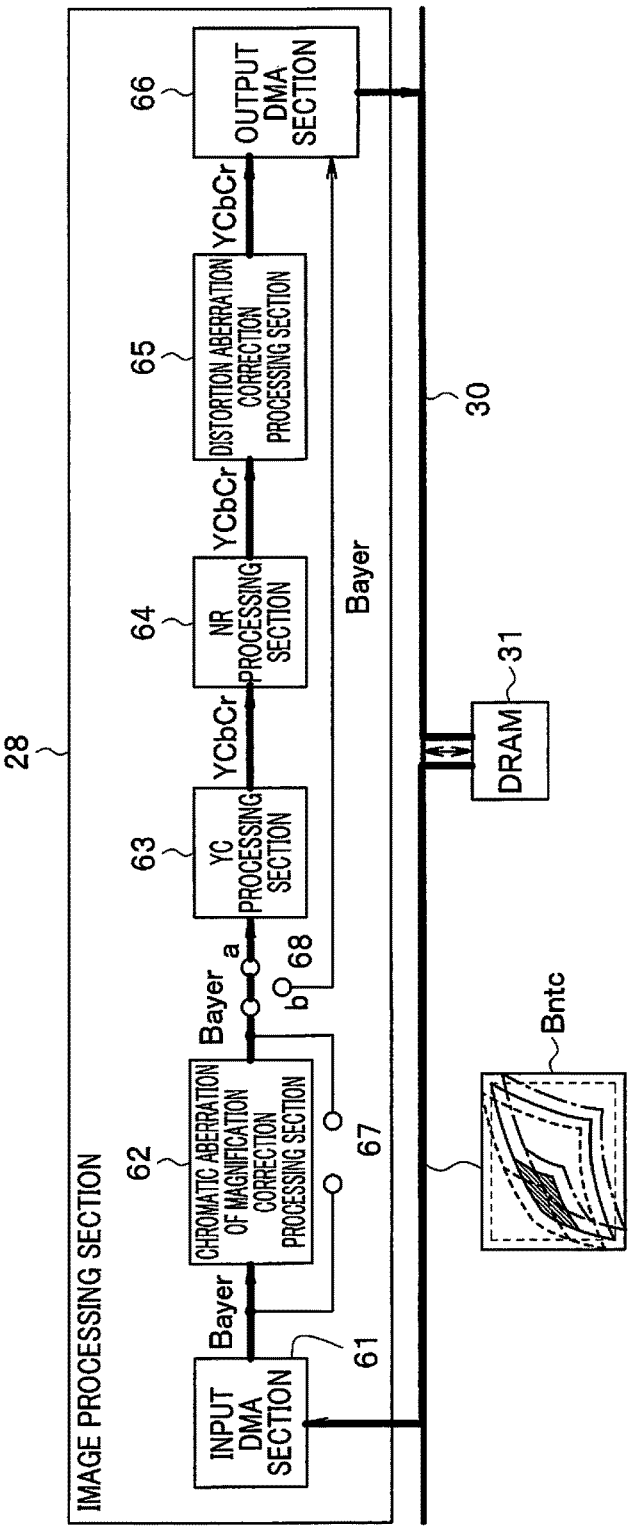
FIG. 12A is an explanatory diagram to explain operation in the first embodiment.

FIG. 12A illustrates a flow of the processing of the image processing pipeline A with a thick line. In step S32, the control section 45 controls the image processing section 28, and uses the image processing pipeline A to perform a series of processes of the chromatic aberration correction, the demosaicking processing (YC), the noise reduction processing (NR), and the deviation aberration correction, on the image of the normal number of pixels read from the DRAM 31. The image of the normal number of pixels subjected to the chromatic aberration correction and the distortion aberration correction processing is written and stored in the DRAM 31.

Next, it is assumed that the pixel shift high-resolution processing mode is specified. In the present embodiment, in the case where the pixel shift high-resolution processing mode is specified, the control section 45 causes the chromatic aberration of magnification correction processing before the pixel shift composition processing.

The control section 45 turns off the switch 67 of the image processing section 28, and causes the switch 68 to select the terminal b. In this case, the image processing section 28 only performs the processing by the chromatic aberration of magnification correction processing section 62. The line of the pipeline processing by the image processing section 28 in this case is referred to as an image processing pipeline B.

Figure 12B:
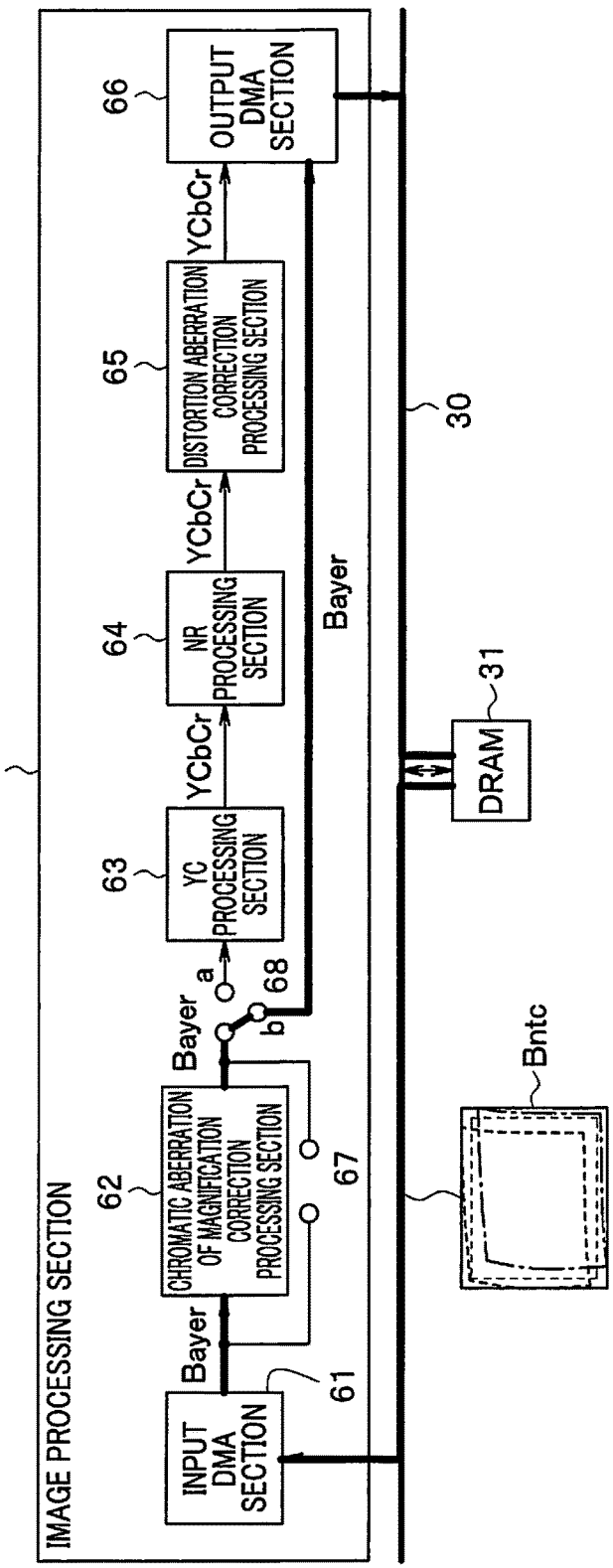
FIG. 12B is an explanatory diagram to explain the operation in the first embodiment.
Figure 12C:
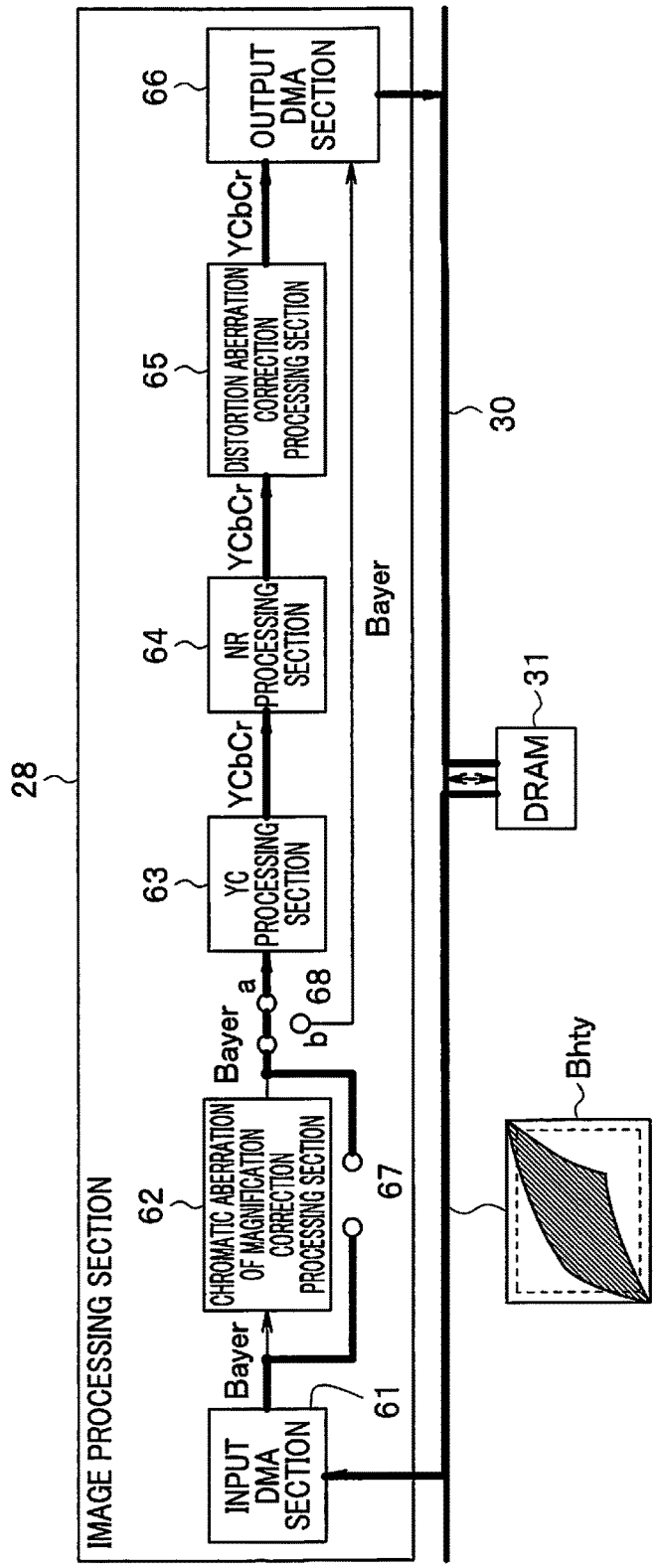
FIG. 12C is an explanatory diagram to explain the operation in the first embodiment.

FIG. 12B illustrates a flow of the processing of the image processing pipeline B with a thick line. In step S34, the control section 45 controls the image processing section 28, and uses the image processing pipeline B to perform the chromatic aberration correction processing on the images of the normal number of pixels read from the DRAM 31. The control section 45 performs the chromatic aberration correction processing on all of the images (Bayer images) of the normal number of pixels used in the pixel shift composition processing. FIG. 11 illustrates an example in which the number of Bayer images used in the pixel shift composition processing is eight. The control section 45 determines in step S35 whether the chromatic aberration correction processing with respect to the eight images of the normal number of pixels has been completed. When the chromatic aberration correction processing has not been completed, the control section 45 repeats the process in step S34. In this case, the eight images of the normal number of pixels subjected to the chromatic aberration correction are written and stored in the DRAM 31.

Next, in step S36, the control section 45 controls the pixel shift composition processing section 27, reads out the images of the normal number of pixels subjected to the chromatic aberration correction processing, from the DRAM 31, and causes the pixel shift composition processing section 27 to perform the pixel shift composition processing. As a result, the pixel shift composition processing section 27 generates a pixel shift high-resolution image. The high-resolution image is provided to and stored in the DRAM 31.

Next, the control section 45 controls the image processing section 28 to execute processing other than the chromatic aberration of magnification correction processing (step S37). In this case, the control section 45 turns on the switch 67 and causes the switch 68 to select the terminal a. The series of processes in this case is equivalent to the processing of the image processing pipeline A without the processing of the chromatic aberration of magnification correction processing section 62. In other words, the processing in step S37 is similar to the processing in step S32 from which the chromatic aberration of magnification correction processing is removed.

In the normal resolution processing mode, the image processing section 28 performs the aberration correction, for example, for each region having the size of the output block Bn1 in FIG. 2. In this case, the processing using the image processing pipeline A illustrated in FIG. 12A is performed, and the block necessary for the chromatic aberration of magnification correction becomes the block Bntc in FIG. 2. In other words, it is sufficient for the buffer memory of each of the processing sections 62 to 65 to have a capacity to hold the region having the size of the block Bntc.

In contrast, in the pixel shift high-resolution processing mode in the present embodiment, the image processing using the image processing pipeline B (chromatic aberration of magnification correction processing) and the image processing using the image processing pipeline A (without performing chromatic aberration of magnification correction processing) are performed by the image processing section 28. In the chromatic aberration of magnification correction processing using the image processing pipeline B, the aberration correction is performed for each region having the size of the output block Bn1 in FIG. 2. In this case, as illustrated in FIG. 12B, data of the region having the size of the block Bntc in FIG. 2 necessary for the chromatic aberration of magnification correction is provided to the image processing pipeline B. In other words, in this case, it is sufficient for the buffer memory of each of the processing sections 62 to 65 to have a capacity to hold the region having the size of the block Bntc.

In addition, in the image processing except for the chromatic aberration of magnification correction processing using the image processing pipeline A, the processing is performed on the high-resolution image, the resolution of which is doubled in each of the vertical and horizontal directions. Therefore, the aberration correction is performed for each region having the size of the output block Bn2 in FIG. 2. In this case, as illustrated in FIG. 12C, data of the region having the size of the block Bhty in FIG. 2 necessary for the distortion aberration correction is provided to the image processing pipeline A (without performing the chromatic aberration of magnification correction processing). In other words, in this case, it is sufficient for the buffer memory of each of the processing sections 62 to 65 to have a capacity to hold the region having the size of the block Bnty. In other words, even in the case where the chromatic aberration of magnification correction processing is performed in the pixel shift high-resolution processing, when the present embodiment is adopted, it is only necessary for the buffer memory to have the capacity equivalent to the capacity of the buffer memory in the normal resolution processing.

As described above, in the present embodiment, in the case where the chromatic aberration correction processing is performed in the pixel shift high-resolution processing, the chromatic aberration correction processing is performed on the color array images before the pixel shift composition processing, the pixel shift composition processing is performed to the color array images subjected to the chromatic aberration correction processing to generate the pixel shift high-resolution image, and the demosaicking processing is performed on the pixel shift high-resolution image to generate the color image. This makes it possible to reduce the size of the image region necessary for the chromatic aberration correction processing to reduce the transmission band, and to prevent the capacity necessary for the buffer memory in the chromatic aberration correction processing section from being increased. In addition, even in the case where the chromatic aberration correction processing, the demosaicking processing, and the distortion aberration correction processing are performed with use of the pipeline processing, it is possible to make the size of the image region necessary for the processing substantially equivalent between the chromatic aberration correction processing section and the distortion aberration correction processing section, and to prevent the capacity necessary for the buffer memory from being increased. Further, it is possible to make the size of the image region necessary for the chromatic aberration correction processing and the distortion aberration correction processing substantially equivalent between in the normal resolution processing and in the pixel shift high-resolution processing, and to prevent the capacity necessary for the buffer memory from being increased. Moreover, since the distortion aberration correction processing is performed on the pixel shift high-resolution image, it is possible to achieve high image quality.

Second Embodiment

Figure 13:
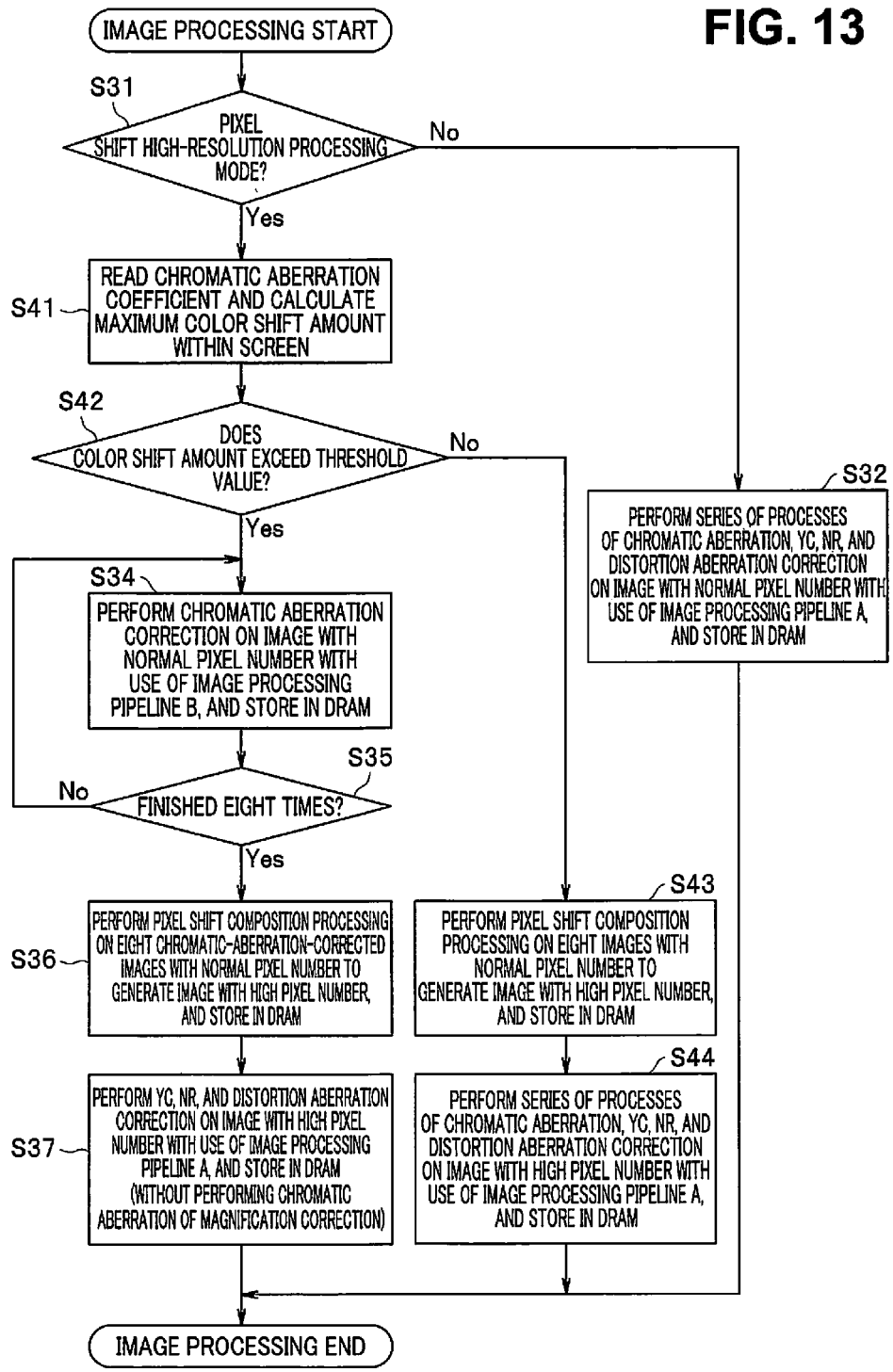
FIG. 13 is a flowchart illustrating an operation flow adopted in a second embodiment of the present invention.

FIG. 13 is a flowchart illustrating an operation flow adopted in a second embodiment of the present invention. The procedure in FIG. 13 same as the procedure in FIG. 11 is denoted by the same reference numeral and description thereof is omitted.

In the first embodiment, the chromatic aberration of magnification correction processing is performed with use of the normal resolution image that is color array image before the pixel shift composition processing. In a case of considering image quality, however, the chromatic aberration of magnification correction processing is preferably performed with use of the pixel shift high-resolution image after the pixel shift composition processing. Therefore, in the present embodiment, in a case where the size of the image region necessary for the chromatic aberration of magnification correction is smaller than a predetermined size, the chromatic aberration of magnification correction processing is performed after the pixel shift composition processing.

The flow in FIG. 13 is different from the flow in FIG. 11 in that processing in steps S41 to S44 are added. In step S41, the control section 45 reads a chromatic aberration correction coefficient and calculates a maximum color shift amount in a screen. The chromatic aberration amount (the color shift amount) is determined depending on the optical system, and the chromatic aberration correction coefficients used for chromatic aberration correction for respective zoom positions and focus positions are held by the flash memory 14 of the interchangeable lens 1. The control section 45 reads the chromatic aberration correction coefficient held by the flash memory 14 through the control section 15 and the I/F 3.

It is assumed that a horizontal and vertical coordinate of the image of the high number of pixels is denoted by (x, y), a horizontal and vertical center coordinate of the image of the high number of pixels is denoted by (x0, y0), and a distance from the center coordinate to the coordinate (x, y) is denoted by r. The distance r is represented by the following equation (1).

$$r = \sqrt{(x-x_0)^2 + (y-y_0)^2} \qquad (1)$$

In this case, the chromatic aberration equation representing the chromatic aberration can be represented by, for example, the following equation (2) when the chromatic aberration correction coefficients are a(i), b(i), and c(i) (i indicates the R image or the B image). Note that r'(x, y, i) indicates a distance from the center coordinate to a position at which the pixel at the coordinate (x, y) is shifted by the chromatic aberration in the R image or the B image.

$$r'(x, y, i) = a(i)r + b(i)r^3 + c(i)r^5 \qquad (2)$$

The control section 45 uses the read chromatic aberration correction coefficients to determine the distance r'(x, y, i) in the above-described equation (2). The control section 45 determines, for example, a correction amount of the chromatic aberration by the following equation (3).

$$d_X(x, y, i) = \left\{ \left( \frac{r'(x, y, i)}{r} - 1 \right) \right\} \times (y - y_0) \qquad (3)$$

$$d_Y(x, y, i) = \left\{ \left( \frac{r'(x, y, i)}{r} - 1 \right) \right\} \times (x - x_0)$$

The control section 45 determines maximum color shift correction amounts DX and DY in the screen by, for example, the following equation (4).

$$D_X = \max_{x,y} [|d_X(x, y, i)|] \qquad (4)$$

$$D_Y = \max_{x,y} [|d_Y(x, y, i)|]$$

In next step S42, the control section 45 determines whether the color shift amount exceeds a predetermined threshold. For example, as the threshold, a value based on the size of the region storable in the buffer memory of each of the processing sections of the pipeline A may be set. For example, the control section 45 determines whether the range of the determined maximum color shift correction amounts DX and DY is within the size of the region that is storable in the buffer memory of each of the processing sections of the pipeline A. When the range is within the size, the control section 45 may determine that the color shift amount is equal to or lower than the threshold, and when the range is not within the size, the control section 45 may determine that the color shift amount exceeds the threshold.

For example, even in a case where a capacity necessary for the normal resolution processing is set for the capacity of the buffer memory of each of the processing sections of the pipeline A, when the color shift amount is equal to or lower than the predetermined threshold, it is possible to perform the chromatic aberration of magnification correction on the high-resolution image after the pixel shift high-resolution processing by the image processing section 28.

When the control section 45 determines that the color shift amount exceeds the predetermined threshold, the control section 45 shifts the processing to step S34, and performs the chromatic aberration correction on the image of the normal number of pixels, as with the first embodiment. In contrast, when the control section 45 determines that the color shift amount does not exceed the predetermined threshold, the control section 45 shifts the processing to step S43.

In step S43, the control section 45 performs the pixel shift composition processing with use of, for example, eight images of the normal number of pixels to generate the pixel shift high-resolution image, and stores the pixel shift high-resolution image in the DRAM 31. In next step S44, the control section 45 uses the image processing pipeline A to perform the series of processes of the chromatic aberration correction, the demosaicking processing (YC), the noise reduction processing (NR), and the distortion aberration correction, on the image of the high number of pixels. The image after the aberration correction thus generated is stored in the DRAM 31.

As described above, in the present embodiment, it is determined whether the color shift amount exceeds the predetermined threshold. When the color shift amount does not exceed the predetermined threshold, the chromatic aberration correction and the distortion aberration correction are performed on the high-resolution image that is obtained through the pixel shift high-resolution processing. As a result, since both of the chromatic aberration correction and the distortion aberration correction are performed on the high-resolution image, it is possible to improve image quality. For example, even in the case where the capacity necessary for the normal resolution processing is set for the capacity of the buffer memory necessary for the pipeline processing of the image processing section, the chromatic aberration correction may be performed on the pixel shift high-resolution image in some cases, which makes it possible to achieve higher image quality without increasing the capacity of the buffer memory.

Further, in the embodiments of the present invention, the digital camera has been described as the apparatus for photographing; however, the camera may be a digital single lens reflex camera, a compact digital camera, a camera for moving image such as a video camera and a movie camera, or a camera incorporated in a personal digital assistant (PDA) such as a mobile phone and a smartphone as a matter of course. In addition, the camera may be an optical apparatus for industrial or medical purposes, such as an endoscope and a microscope.

The present invention is not just limited to the above-described embodiments, and the present invention is embodied by modifying the components without departing from the scope of the invention, for implementation. In addition, various inventions may be made by appropriate combinations of the plurality of components disclosed in the above-described embodiments. For example, some of the components described in the embodiments may be removed.

Note that, even when terms "first", "next", etc. are used in the description of the claims, the specification, and the operation flows in the drawings for convenience, the terms do not intend to mean that the execution order is essential. In addition, among the respective steps configuring these operation flows, the steps not influencing essence of the invention may be appropriately omitted, as a matter of course.

In addition, many of the control and the functions described mainly in the flowcharts in the above-described technology are settable by programs, and a computer reads and executes the programs, which makes it possible to realize the above-described control and functions. All or a portion of the programs may be recorded or stored, as a computer program product, in portable media such as a flexible disk, a CD-ROM, and a nonvolatile memory, and storage media such as a hard disk and a volatile memory, and the programs may be distributed or supplied in product shipment, through a portable media, or through a communication line. A user downloads the programs through a communication network and installs the programs in a computer, or installs the programs from a recording medium in the computer. This makes it possible to easily realize the image pickup apparatus according to the present embodiment.

What is claimed is:

1. An image pickup apparatus, comprising:
  an image pickup device that includes pixels in a predetermined color array and is configured to be able to acquire a plurality of color array images corresponding to the color array through pixel shift;
  a chromatic aberration correction processing section configured to receive the plurality of color array images and to perform chromatic aberration correction processing on each of the plurality of color array images;
  a pixel shift composition processing section configured to perform pixel shift composition processing on the plurality of color array images that are subjected to the chromatic aberration correction processing by the chromatic aberration correction processing section, to acquire a pixel shift high-resolution image; and
  a demosaicking processing section configured to perform demosaicking processing on the pixel shift high-resolution image.

2. The image pickup apparatus according to claim 1, comprising a distortion aberration correction processing section configured to perform distortion aberration correction processing on the pixel shift high-resolution image after the demosaicking processing.

3. The image pickup apparatus according to claim 2, comprising:
  a first image processing pipeline in which processing by the chromatic aberration correction processing section is performable;
  a second image processing pipeline in which a series of processes by the demosaicking processing section and the distortion aberration correction processing section is performable; and
  a control section configured to cause the first image processing pipeline to perform the chromatic aberration correction processing on the plurality of color array images, to cause the pixel shift composition processing section to perform the pixel shift composition processing on the plurality of color array images after the chromatic aberration correction processing, and to cause the second image processing pipeline to perform the demosaicking processing and the distortion aberration correction processing on the pixel shift high-resolution image after the pixel shift composition processing.

4. The image pickup apparatus according to claim 3, comprising a third image processing pipeline in which a series of processes by the chromatic aberration correction processing section, the demosaicking processing section, and the distortion aberration correction processing section is performable, wherein
  in a case where one color array image corresponding to the color array is outputted from the image pickup device, the control section causes the third image processing pipeline to perform the processing on the one color array image.

5. The image pickup apparatus according to claim 4, wherein
  the color aberration correction processing section is a processing section common to the first and third image processing pipelines, the demosaicking processing section and the distortion aberration correction processing section are processing sections common to the second and third image processing pipelines, and a buffer memory of each of the processing sections in the first to third image processing pipelines is set to a capacitance value corresponding to the case where the one color array image corresponding to the color array is outputted from the image pickup device.

6. The image pickup apparatus according to claim 1, comprising a memory configured to hold information of chromatic aberration characteristics for the chromatic aberration correction processing by the chromatic aberration correction processing section.

7. The image pickup apparatus according to claim 4, comprising an image processing section that includes the chromatic aberration correction processing section, the demosaicking processing section, the distortion aberration correction processing section, a first switch, and a second switch, wherein
  the first switch supplies the plurality of color array images to the chromatic aberration correction processing section or the second switch by switching, and
  the second switch outputs without any change, or provides to the demosaicking processing section, an output of the chromatic aberration correction processing section or the color array images supplied from the first switch.

8. The image pickup apparatus according to claim 7, wherein
  the first image processing pipeline is configured by providing the plurality of color array images to the chromatic aberration correction processing section by the first switch and outputting the output of the chromatic aberration correction processing section without change by the second switch,
  the second image processing pipeline is configured by providing the plurality of color array images to the second switch by the first switch and providing the color array images from the first switch to the demosaicking processing section by the second switch, and
  the third image processing pipeline is configured by providing the plurality of color array images to the chromatic aberration correction processing section by the first switch and providing the output of the chromatic aberration correction processing section to the demosaicking processing section by the second switch.

9. An image pickup apparatus, comprising:
  an image pickup device that includes pixels in a predetermined color array and is configured to be able to acquire a plurality of color array images corresponding to the color array through pixel shift;
  a pixel shift composition processing section configured to perform pixel shift composition processing to acquire a pixel shift high-resolution image;
  an image processing section that can perform first image processing pipeline processing in which processing by a chromatic aberration correction processing section is performable, second image processing pipeline processing in which a series of processes by a demosaicking processing section and a distortion aberration correction processing section is performable, and third image processing pipeline processing in which a series of processes by the chromatic aberration correction processing section, the demosaicking processing section, and the distortion aberration correction processing section is performable; and
  a control section configured to control order of the pixel shift composition processing and the first to third image processing pipeline processing.

10. The image pickup apparatus according to claim 9, wherein the control section performs the third image processing pipeline processing when a normal resolution image is acquired, and the control section sequentially performs the first image processing pipeline processing, the pixel shift composition processing, and the second image processing pipeline processing when a pixel shift high-resolution image is acquired.

11. The image pickup apparatus according to claim 9, wherein when the pixel shift high-resolution image is acquired, the control section sequentially performs the first image processing pipeline processing, the pixel shift composition processing, and the second image processing pipeline processing in a case where a color shift amount based on a chromatic aberration coefficient exceeds a predetermined threshold, and the control section sequentially performs the pixel shift composition processing and the third image processing pipeline processing in a case where the color shift amount does not exceed the predetermined threshold.

12. An image pickup method, comprising:

acquiring a plurality of color array images corresponding to a predetermined color array through pixel shift photographing by an image pickup device that includes pixels in the predetermined color array;

performing chromatic aberration correction processing on each of the plurality of color array images;

performing pixel shift composition processing on the plurality of color array images subjected to the chromatic aberration correction processing to acquire a pixel shift high-resolution image; and performing demosaicking processing on the pixel shift high-resolution image.

13. A non-temporary computer-readable recording medium having a recorded image pickup program that causes a computer to execute:

acquiring a plurality of color array images corresponding to a predetermined color array through pixel shift photographing by an image pickup device that includes pixels in the predetermined color array;

performing chromatic aberration correction processing on each of the plurality of color array images;

performing pixel shift composition processing on the plurality of color array images subjected to the chromatic aberration correction processing to acquire a pixel shift high-resolution image; and performing demosaicking processing on the pixel shift high-resolution image.

* * * * *